US009918217B1

United States Patent
Hooda et al.

(10) Patent No.: US 9,918,217 B1
(45) Date of Patent: Mar. 13, 2018

(54) FAST ROAMING ACROSS A NETWORK FABRIC

(71) Applicant: Cisco Technology, Inc., San Jose, CA (US)

(72) Inventors: Sanjay Kumar Hooda, Pleasanton, CA (US); Gaurav Dawra, Sunnyvale, CA (US); Sudhir Kumar Jain, Fremont, CA (US); Atri Indiresan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/405,614

(22) Filed: Jan. 13, 2017

(51) Int. Cl.
*H04W 8/18* (2009.01)
*H04W 8/16* (2009.01)
*H04W 64/00* (2009.01)
*H04W 8/00* (2009.01)
H04W 88/12 (2009.01)
H04W 84/12 (2009.01)
H04W 88/16 (2009.01)

(52) U.S. Cl.
CPC ............ *H04W 8/16* (2013.01); *H04W 8/005* (2013.01); *H04W 64/006* (2013.01); *H04W 84/12* (2013.01); *H04W 88/12* (2013.01); *H04W 88/16* (2013.01)

(58) Field of Classification Search
CPC ..... H04L 45/74; H04L 51/30; H04L 12/2803; H04L 69/18; H04L 69/22; H04L 63/0823; H04W 40/02; H04W 76/022; H04W 84/18; H04W 12/06; G06F 8/65
USPC .............. 370/311, 349, 254; 455/432.1, 41.1
See application file for complete search history.

(56) References Cited

U.S. PATENT DOCUMENTS

| 2011/0164546 A1* | 7/2011 | Mishra | H04W 40/026 370/312 |
| 2016/0191380 A1* | 6/2016 | De | H04L 45/74 370/338 |

* cited by examiner

*Primary Examiner* — Phuoc H Doan
(74) *Attorney, Agent, or Firm* — Merchant & Gould P.C.

(57) ABSTRACT

Fast roaming across a network fabric may be provided. A route device may receive location information corresponding to a client device in response to roaming by the client device from a first access point connected to a first network device to a second access point connected to a second network device. The first network device and the second network device may comprise fabric edge nodes on the fabric network. The first network device and the second network device may be ones of a plurality of network devices in the fabric network. On detecting the roaming of the client device, the route device may be updated with the new location, and then the route device may send, to the plurality of network devices in the fabric network, the location information corresponding to the client device.

16 Claims, 3 Drawing Sheets

FAST ROAMING ACROSS A NETWORK FABRIC

TECHNICAL FIELD

The present disclosure relates generally to roaming in an overlay network.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
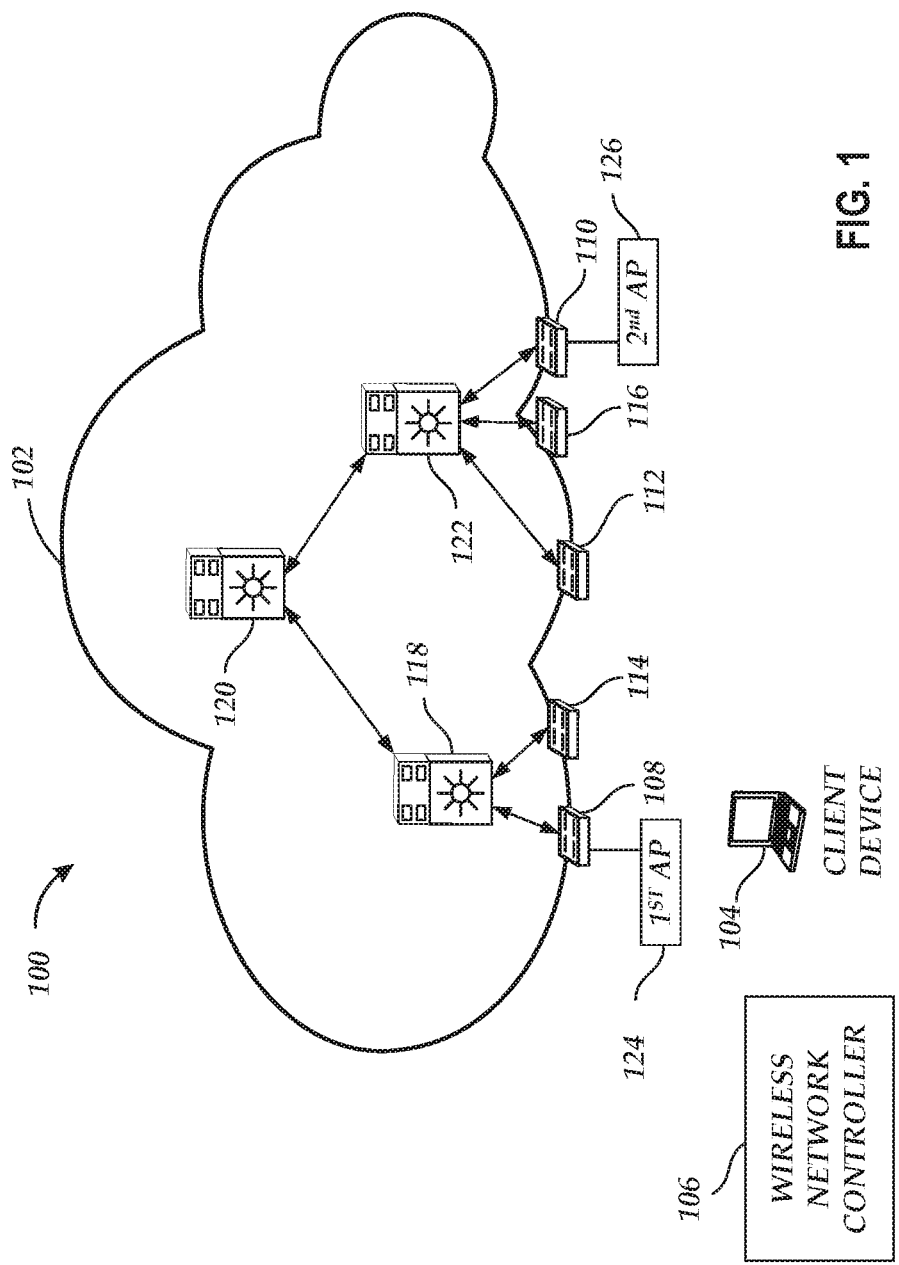
FIG. 1 shows a system for providing fast roaming across a network fabric.

Fast roaming across a network fabric may be provided. A route device may receive location information corresponding to a client device in response to roaming by the client device from a first access point connected to a first network device to a second access point connected to a second network device. The first network device and the second network device may comprise fabric edge nodes on the fabric network. The first network device and the second network device may be ones of a plurality of network devices in the fabric network. Then the route device may send, to the plurality of network devices in the fabric network, the location information corresponding to the client device.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A fabric network is a network topology in which components pass data to each other through interconnecting network switches. Network nodes, in the fabric network, interconnect via one or more of the interconnecting network switches. In an integrated wireless solution with a fabric network, when a host (e.g., a client device) moves (i.e., roams) from a first location on the fabric network (e.g., "location x") to a second location (e.g., "location y") on the fabric network, the fabric network should converge on this move as soon as possible. Because of a wireless handoff during the move, a Wireless Local Area Network Controller (WLC) on the network may know about the move before the traffic to the host is started over the fabric network. With the fabric network, the traffic (wired or wireless) is going directly using the fabric network. With conventional systems, only when the traffic from the moved host is sent does the fabric network learn of this move. This may be too late and may cause a mobility issue on roam.

Embodiments of the disclosure may solve this mobility issue on roam by integrating the WLC with a control plane of the fabric network. Consistent with embodiments of the disclosure, the WLC may install in a Route Reflector (RR) of the fabric network information including, for example, an application route and additional parameters (e.g., metadata to appropriately identify the location of the access point (AP)) that may lead to faster network convergence.

FIG. 1 shows a system 100 consistent with embodiments of the disclosure for providing fast roaming. As shown in FIG. 1, system 100 may comprise a network 102, a client device 104, and a wireless network controller 106. Network 102 may comprise a plurality of network devices (e.g., a first network device 108, a second network device 110, a third network device 112, a fourth network device 114, a fifth network device 116, a sixth network device 118, a seventh network device 120, and an eighth network device 122). The plurality of network devices in network 102 may comprise, but are not limited to, switches and routers for example. Network 102 may comprise any number of network devices and is not limited to eight. Any number of client devices may be included in system 100 and is not limited to one. Client device 104 may comprise any type device that may communicate over network 102. For example, client device 104 may comprise, but is not limited to, a cellular base station, a tablet device, a mobile device, a smart phone, a telephone, a remote control device, a set-top box, a digital video recorder, a cable modem, a personal computer, a network computer, a mainframe, a router, or other similar microcomputer-based device.

Network 102 may comprise a fabric network. The fabric network may comprise an underlay and an overlay. The underlay may deal with connectivity between fabric elements (e.g., the plurality of network devices) and the overlay may deal with user traffic entering the fabric. Traffic may enter the fabric network (i.e., network 102) through fabric edge nodes (e.g., first network device 108, second network device 110, third network device 112, fourth network device 114, and fifth network device 116). The traffic may be routed through network 102 via a plurality of intermediate nodes (i.e., network devices) comprising, for example, sixth network device 118, seventh network device 120, and eighth network device 122. The fabric edge nodes may be responsible for encapsulating a packet with a fabric header that may contain an egress fabric edge node address. When a packet (e.g., a frame) arrives at the egress fabric edge node, a fabric header may be stripped off and the native packet may be forwarded according to an inner address. The fabric network may be capable of providing layer-2 and layer-3 services on top of the underlay. The fabric network may have end-points (e.g., client device 104) connected to it. The fabric network comprises, for example, a Border Gateway Protocol-Ethernet Virtual Private Network (BGP-EVPN) control plane with a data plane. The data plane may comprise a tunnel-based data plane such as, but not limited to, Virtual Extensible LAN (VXLAN), Multiprotocol Label Switching (MPLS), Locator/ID Separation Protocol (LISP), Generic Routing Encapsulation (GRE), Layer 2 Tunneling Protocol Version 3 (L2TPv3), and FabricPath.

Consistent with embodiments of the disclosure, a control plane (e.g., in the overlay of the fabric network) of network 102 may track the location of endpoints (i.e., hosts connected to the fabric network). End endpoints tracked by the control plane may include, but are not limited to, client device 104. Client device 104 may have an identifier, for example, a media access control (MAC) address, an internet protocol (IP) (e.g., IPv4 or IPv6) address, or any other identifier for the client device connected to the fabric network. Any one of the plurality of network devices (e.g., first network device 108, second network device 110, third network device 112, fourth network device 114, fifth network device 116, sixth network device 118, seventh network device 120, and eighth network device 122) may comprise or otherwise perform the function of a route device, which may comprise a Route Reflector (RR). The route device may provide location information (e.g., routes) to the plurality of client devices for sending packets to client devices (e.g., client device 104) connected to network 102.

Wireless network controller 106 may control a plurality of wireless access points including, but not limited to, a first access point 124 and a second access point 126. A wireless access point (AP) (e.g., first access point 124 and second access point 126) may comprise a networking hardware device that may allow wireless compliant (e.g., Wi-Fi compliant) devices (e.g., client device 104) to connect to a wired network (e.g., network 102). A wireless access point may connect to a fabric edge node, for example, first access point 124 may connect to first network device 108 and second access point 126 may connect to second network device 110.

Wireless network controller 106 may record which access points client devices roam to. In other words, wireless network controller 106 may log client devices that associate to an access point, then re-associate (i.e., roam) to another access point. For example, wireless network controller 106 may log when client device 104 associates to first access point 124. Moreover, wireless network controller 106 may log when client device 104 later moves away from first access point 124 and then re-associates (i.e., roams) to second access point 126. Wireless network controller 106 may comprise, but is not limited to, a Wireless Local Area Network Controller (WLC) or a Client Tracking Database.

Figure 2:
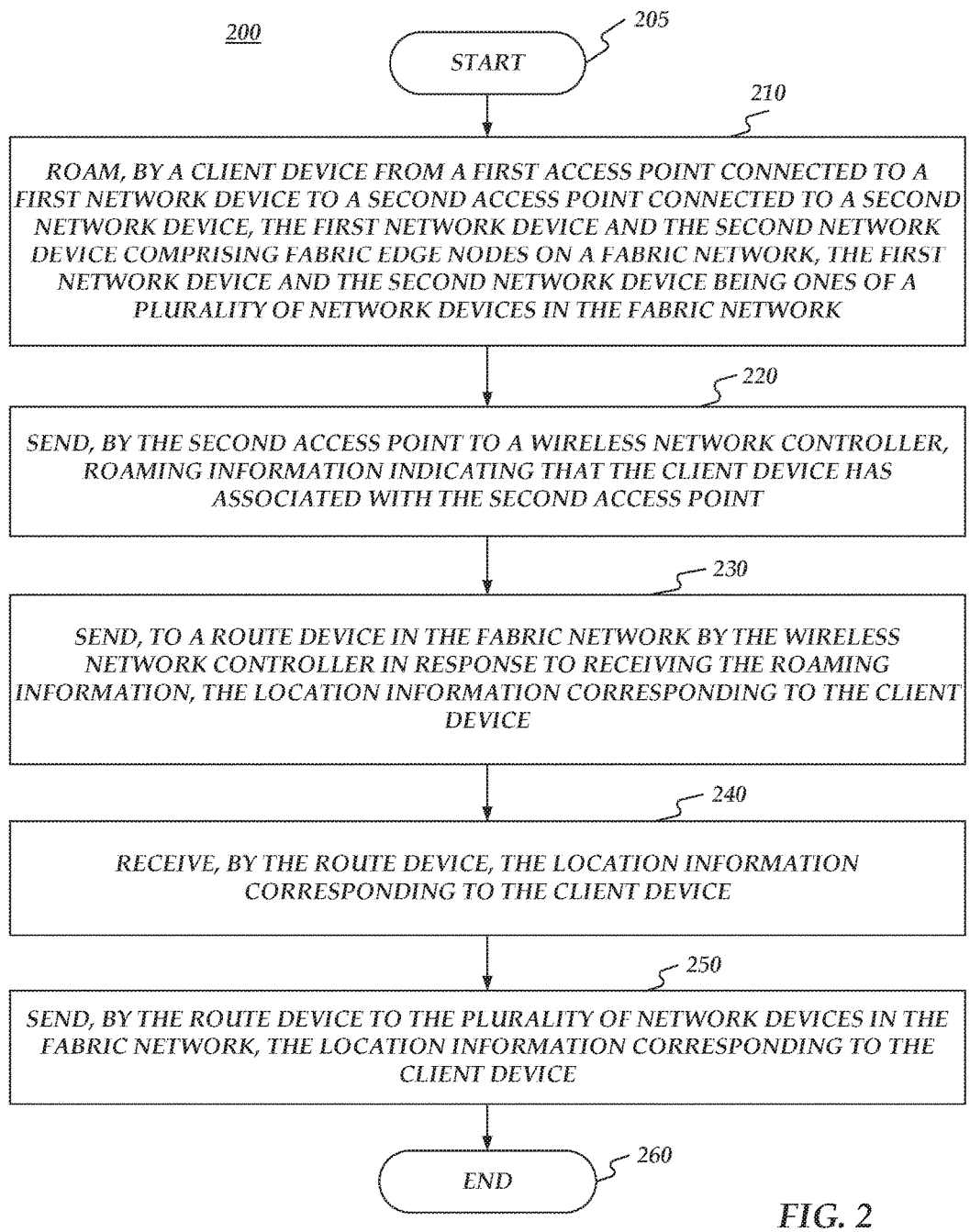
FIG. 2 is a flow chart of a method for providing fast roaming across a network fabric.

FIG. 2 is a flow chart setting forth the general stages involved in a method 200 consistent with an embodiment of the disclosure for providing fast roaming. Implementations of method 200 may be described in greater detail below.

Method 200 may begin at starting block 205 and proceed to stage 210 where client device 104 may roam from first access point 124 connected to first network device 108 to second access point 126 connected to second network device 110. First network device 108 and second network device 110 may comprise fabric edge nodes on network 102. For example, a user of client device 104 may move client device 104 from an area covered by first access point 124 to an area covered by second access point 126.

From stage 210, where client device 104 roams from first access point 124 connected to first network device 108 to second access point 126 connected to second network device 110, method 200 may advance to stage 220 where second access point 126 may send wireless network controller 106 roaming information indicating that client device 104 has associated with second access point 126. For example, wireless network controller 106 may record which access points client devices roam to. In other words, wireless network controller 106 may log client devices that associate to an access point, then re-associate (i.e., roam) to another access point. For example, wireless network controller 106 may log when client device 104 associates to first access point 124. Moreover, wireless network controller 106 may log when client device 104 later moves away from first access point 124 and then re-associates (i.e., roams) to second access point 126. The roaming information may comprise, but is not limited to, an IP address and/or a MAC address of client device 104 and data indicating that client device 104 has associated with second access point 126 and that second access point 126 is connected to second network device 110.

Once second access point 126 sends wireless network controller 106 roaming information indicating that client device 104 has associated with second access point 126 in stage 220, method 200 may continue to stage 230 where wireless network controller 106 may, in response to receiving the roaming information, send to the route device in network 102 the location information corresponding to client device 104. For example, wireless network controller 106 (e.g., a WLC) may install an "application route" (and/or additional parameters (e.g., metadata to appropriately identify the location of second access point 126 that may lead to faster network convergence)) in the route device (e.g., a Route Reflector (RR)) on behalf of second network device 110. In essence, wireless network controller 106 may act as a proxy detecting device for second network device 110.

After wireless network controller 106 sends to the route device in network 102 the location information corresponding to client device 104 in stage 230, method 200 may proceed to stage 240 where the route device may receive the location information corresponding to client device 104. For example, the route device may receive the location information corresponding to client device 104 from wireless network controller 106.

From stage 240, where the route device receives the location information corresponding to client device 104, method 200 may advance to stage 250 where the route device may send, to the plurality of network devices in network 102, the location information corresponding to client device 104. For example, the route device may send an update to all switches (e.g., the plurality of network devices) regarding this new route with a high sequence number and instructions to purge any old routes for client device 104. This update may reach all the fabric edge nodes (e.g., first network device 108, second network device 110, third network device 112, fourth network device 114, and fifth network device 116). Then the traffic to client device

104 may start in an optimized fashion. Once the route device sends, to the plurality of network devices in network 102, the location information corresponding to client device 104 in stage 250, method 200 may then end at stage 260.

Figure 3:
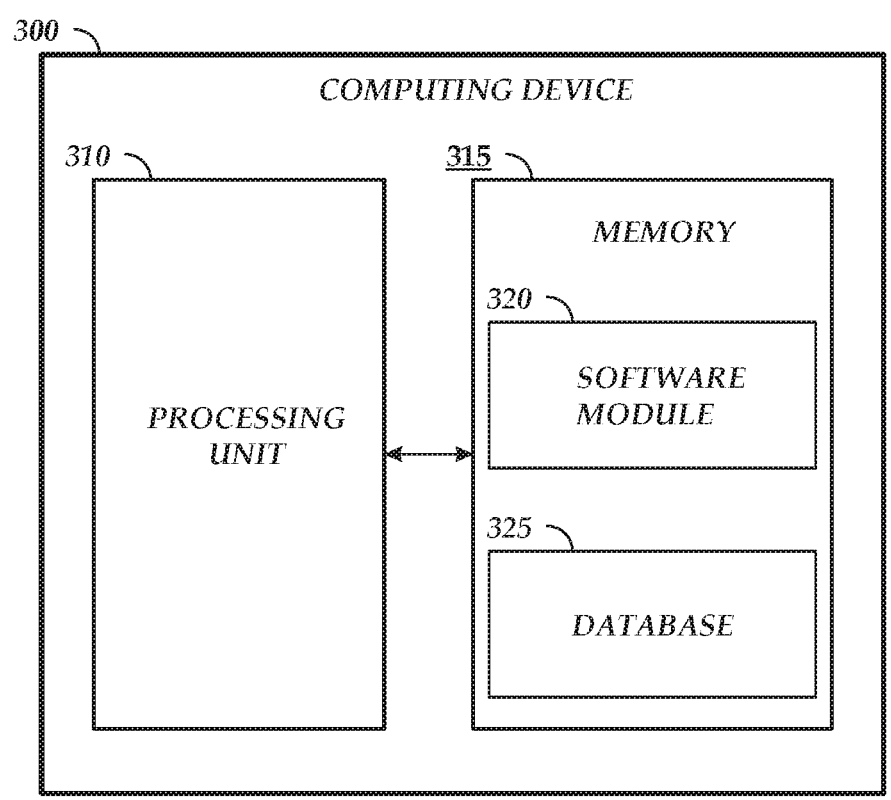
FIG. 3 shows a computing device.

FIG. 3 shows a computing device 300. As shown in FIG. 3, computing device 300 may include a processing unit 310 and a memory unit 315. Memory unit 315 may include a software module 320 and a database 325. While executing on processing unit 310, software module 320 may perform processes for providing fast roaming, including for example, any one or more of the stages from method 200 described above with respect to FIG. 2. Computing device 300, for example, may provide an operating environment for any one or more of the plurality of network devices in network 102, client device 104, wireless network controller 106, first access point 124, or second access point 126. Plurality of network devices in network 102, client device 104, wireless network controller 106, first access point 124, or second access point 126 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. Furthermore, computing device 300 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand-held computer, a conventional telephone, or a Wireless Fidelity (Wi-Fi) access point. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving, by a route device in a fabric network in response to roaming, by a client device from a first access point connected to a first network device to a second access point connected to a second network device, location information corresponding to the client device, the first network device and the second network device comprising fabric edge nodes on the fabric network, the first network device and the second network device being ones of a plurality of network devices in the fabric network comprising a Border Gateway Protocol-Ethernet Virtual Private Network (BGP-EVPN) comprising a control plane and a data plane; and
sending, by the route device to the plurality of network devices in the fabric network, the location information corresponding to the client device.

2. The method of claim 1, wherein receiving the location information corresponding to the client device comprises receiving the location information from a wireless network controller.

3. The method of claim 1, wherein receiving the location information corresponding to the client device comprises receiving the location information from a wireless network controller comprising a Wireless Local Area Network Controller (WLC).

4. The method of claim 1, wherein receiving by the route device comprises receiving by the route device comprising a Route Reflector (RR).

5. The method of claim 1, further comprising sending, by the second access point to a wireless network controller, roaming information indicating that the client device has associated with the second access point.

6. The method of claim 5, further comprising sending, to the route device by the wireless network controller in response to receiving the roaming information, the location information corresponding to the client device based on the roaming information.

7. The method of claim 1, further comprising instructing the plurality of network devices, by the route device, to delete older routes corresponding to the client device.

8. A method comprising:
roaming, by a client device from a first access point connected to a first network device to a second access point connected to a second network device, the first network device and the second network device comprising fabric edge nodes on a fabric network, the first network device and the second network device being ones of a plurality of network devices in the fabric network;
sending, by the second access point to a wireless network controller, roaming information indicating that the client device has associated with the second access point;
sending, to a route device in the fabric network by the wireless network controller in response to receiving the roaming information, location information corresponding to the client device based on the roaming information;
receiving, by the route device in the fabric network, the location information corresponding to the client device, wherein receiving, by the route device in the fabric network, the location information comprises receiving, by the route device in the fabric network, the location information wherein the fabric network comprises a Border Gateway Protocol-Ethernet Virtual Private Network (BGP-EVPN) comprising a control plane and a data plane; and
sending, by the route device to the plurality of network devices in the fabric network, the location information corresponding to the client device.

9. The method of claim 8, wherein receiving the location information corresponding to the client device comprises receiving the location information from a wireless network controller.

10. The method of claim 8, wherein receiving the location information corresponding to the client device comprises receiving the location information from a wireless network controller comprising a Wireless Local Area Network Controller (WLC).

11. The method of claim 8, wherein receiving by the route device comprises receiving by the route device comprising a Route Reflector (RR).

12. An apparatus comprising:
a memory storage; and
a processing unit coupled to the memory storage, wherein the processing unit is operative to:
receive location information corresponding to a client device in response to roaming, by the client device from a first access point connected to a first network device to a second access point connected to a second network device, the first network device and the second network device comprising fabric edge nodes on a fabric network, the first network device and the second network device being ones of a plurality of network devices in the fabric network, wherein the fabric network comprises a Border Gateway Protocol-Ethernet Virtual Private Network (BGP-EVPN) comprising a control plane and a data plane; and
send, to the plurality of network devices in the fabric network, the location information corresponding to the client device.

13. The apparatus of claim 12, wherein the processing unit being operative to receive the location information corresponding to the client device comprises the processing unit being operative to receive the location information from a wireless network controller.

14. The apparatus of claim 12, wherein the processing unit being operative to receive the location information corresponding to the client device comprises the processing unit being operative to receive the location information from a wireless network controller comprising a Wireless Local Area Network Controller (WLC).

15. The apparatus of claim 12, wherein the apparatus comprises a Route Reflector (RR).

16. The apparatus of claim 12, wherein the location information comprises an application route.

* * * * *